United States Patent Office 2,943,202
Patented June 28, 1960

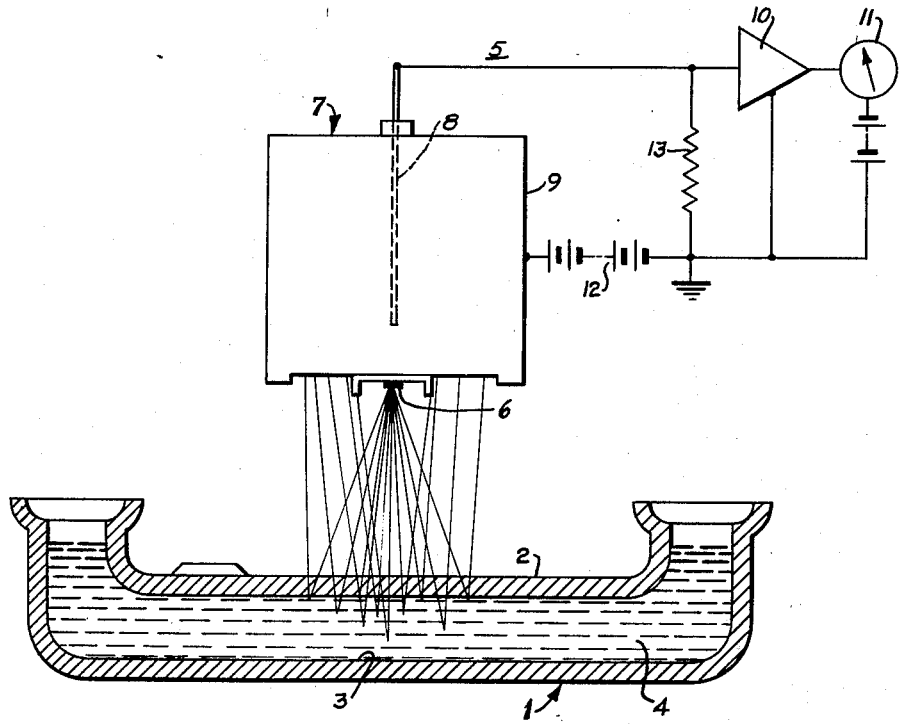
INVENTOR.
PAUL KRAMER

2,943,202

APPARATUS FOR MEASURING WALL THICKNESS OR DENSITY BY RADIATION DETECTION

Paul Kramer, New York, N.Y., assignor to Curtiss-Wright Corporation, a corporation of Delaware Filed Jan. 26, 1956, Ser. No. 561,501

2 Claims. (Cl. 250—83.6)

This invention relates to a method of and apparatus for measuring by means of radiation detection the thickness or density of a wall, in particular a wall of a hollow article such as a casting for example, composed of material having a comparatively low atomic number.

Heretofore, considerable difficulty has been experienced in measuring by radiation detection methods the wall thickness of hollow articles, especially hollow articles of irregular form or shape, due to the problem of placing a source of radiation and a radiation detector at opposite sides respectively of the wall in order to measure absorbed radiation. Various "backscatter" and reflection methods wherein the radiation source and detector are both located outside the article have been proposed; however the known methods are not well suited for measurement of wall thickness of certain articles, such as where the article wall is irregular in shape, thin and composed of metal having a comparatively low atomic number. That is, in the case of the "backscatter" method using beta radiation, the percentage of incident betas that are "backscattered" or reflected for detection purposes is a function of the atomic numbers of both the casting material and backing material, and also of the thickness of the casting, assuming saturation thickness of the backing material. Where the casting material is magnesium for example with a comparatively low atomic number (12) and the backing material is air, it will be readily appreciated that the backscatter radiation is comparatively weak and unreliable for measurement purposes.

A principal object of the present invention therefore is an improved method of and apparatus for measuring by radiation detection the thickness or density of a wall, one side of which is inaccessible for practical purposes as regards the location of measuring equipment.

In accordance with the present invention this problem is solved by using a liquid having a high atomic number, such as mercury (atomic No. 80 and density 13.55), for the backing material. The mercury backing is ideally suited for hollow articles, such as castings, etc., as it can be poured into the casting cavity so as to make good contact with the wall thereof; also by reason of its high atomic number a large quantity for saturation thickness is not required. The percentage of incident betas that now may be "backscattered" is therefore materially increased so that the detection apparatus can generate a reasonably strong and reliable signal for measuring purposes.

The invention will be more fully set forth in the following description referring to the accompanying drawing, and the features of novelty will be pointed out with particularity in the claims annexed to and forming a part of this specification.

Referring to the drawing, the single figure thereof is a partly schematic and partly diagrammatic illustration of radiation detection apparatus for measuring the wall thickness or density of a hollow casting in practicing the present invention.

The article to be measured in the present instance comprises a hollow metal casting 1 composed of very light-weight metal such as magnesium. As previously pointed out this metal has a comparatively low atomic number 12, the density being only 1.741. The casting is shown as forming an irregularly shaped tube, manifold section or the like. The casting wall 2, especially where the article is used in aircraft engine construction, may be comparatively thin consistent with required mechanical strength and ruggedness. In articles of this type the inner wall surfaces are not readily accessible and wall thickness measurement by the conventional radiation absorption method is not practical.

In practicing the invention, the casting 1 is properly positioned, or if necessary closed off, so that the casting cavity 3 can retain liquid. A high atomic number liquid 4 such as mercury is then poured into the cavity so as to make contact with the wall to be measured. The mercury should be in sufficient quantity so that its depth (with respect to radiation) equals or exceeds saturation thickness for the specific apparatus.

Suitable radiation detecting and measuring apparatus generally indicated at 5, together with a source of radiation 6, are located exteriorly of the casting in proper spaced relation to the wall 2 that is to be measured. By way of example, a beta ray source, such as ruthenium 106, may be used for providing the radiation, although it should be understood that any suitable source of X, gamma or beta rays may be used where suitable. A conventional detector, such as an ionization chamber 7 is located in proximity to the radiation source and is shielded from direct radiation therefrom so that it receives only reflected or backscattered radiation from the casting 1. The ionization chamber 7 and its associated measuring circuitry may be of conventional and well known design. As shown, the ionization chamber includes a negative probe electrode 8 and a conducting wall 9 forming the positive electrode. The electrodes are connected to an amplifier 10 the output of which is connected to a calibrated indicator 11. A high D.C. potential indicated at 12 is impressed on the wall electrode 9 and is connected as illustrated to a grounded resistor 13 which completes an external circuit with the electrode 8. The lower wall of the ionization chamber may be provided with suitable glass-sealed apertures (not shown) through which radiation enters the chamber causing ionization with resulting current flow through the external circuit including the resistor 13 according to the intensity of radiation entering the chamber. Thus the amplifier 10 is responsive to the potential difference across resistor 13 and, since this potential difference is proportional to the radiation received by the detector, the indicator 11 can be calibrated in terms thereof.

Although a simple indicating system is illustrated, it should be understood that the signal from the amplifier 10 can be used either to indicate the departure of the thickness or density of the wall 2 from a predetermined value or may also by well known means control a recorder.

In operation the article to be measured is placed a predetermined distance from the radiation source 6 and is moved relative thereto so as to measure at different points along the casting wall. The incident betas which are reflected or backscattered from the casting material and mercury combination enter the ionization chamber 7 in sufficient intensity to produce detection signals as previously described.

The casting thickness can be readily calibrated since the mercury is in sufficient depth in the direction of the radiation so as to equal or exceed saturation thickness for the specific measuring equipment. By "saturation thickness" is meant sufficient thickness to absorb radiation in excess of that reflected or backscattered. When the backing material has saturation thickness, the radiation reflected therefrom is constant; hence any variation from this constant amount represents that due to the casting wall.

An inherent advantage of the present invention resides in the comparatively large difference between the atomic number of the scatterer, i.e. the casting material, and the atomic number of the backing material, i.e. mercury; the greater this difference, the greater are the sensitivity and accuracy of the measurement.

It should be understood that this invention is not limited to specific details of construction and arrangement thereof herein illustrated, and that changes and modifications may occur to one skilled in the art without departing from the spirit of the invention.

What is claimed is:

1. Apparatus for measuring the thickness or density of material in a wall of a hollow article comprising a source of penetrative radiation located at an exterior side of said wall, a liquid such as mercury having an atomic number high as compared with said material disposed within said article and in contact with the opposite side of said wall, so that the depth of said liquid in the direction of radiation corresponds to saturation thickness, and radiation detecting and measuring apparatus located in proximity to said source at said exterior side of said wall and responsive to radiation reflected from said material.

2. Apparatus for measuring the thickness or density of a wall of a hollow casting composed of low atomic number metal such as magnesium comprising a source of penetrative radiation located at the exterior of said casting, a liquid having an atomic number high as compared with the material of said casting within said casting and in contact with said wall, said liquid having a depth in the direction of radiation equal to or exceeding saturation thickness, and radiation detecting and measuring apparatus located at the exterior of said casting in proximity to said source and responsive to radiation reflected from said material.

References Cited in the file of this patent

UNITED STATES PATENTS 2,675,479     Stewart et al.  ----------- Apr. 13, 1954

OTHER REFERENCES

Radioisotopes in Industry, a text edited by Bradford, published by Reinhold Publishing Corp., New York, N.Y., 1953, pages 81 and 82.